United States Patent
Agiwal et al.

(10) Patent No.: US 10,383,146 B2
(45) Date of Patent: Aug. 13, 2019

(54) SYSTEM AND METHODS FOR DETECTION OF HIDDEN NODES IN CELLULAR SYSTEMS ON UNLICENSED BANDS

(71) Applicant: Samsung Electronics Co., Ltd., Suwon-si (KR)

(72) Inventors: Anil Agiwal, Bangalore (IN); Anshuman Nigam, Bangalore (IN); Ashok Kumar Reddy Chavva, Bangalore (IN); Nagacharan Udupi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 15/518,224

(22) PCT Filed: Oct. 8, 2015

(86) PCT No.: PCT/KR2015/010679
§ 371 (c)(1),
(2) Date: Apr. 10, 2017

(87) PCT Pub. No.: WO2016/056865
PCT Pub. Date: Apr. 14, 2016

(65) Prior Publication Data
US 2017/0303312 A1    Oct. 19, 2017

(30) Foreign Application Priority Data

Oct. 10, 2014 (IN) .......................... 5101/CHE/2014
Oct. 7, 2015 (IN) .......................... 5101/CHE/2014

(51) Int. Cl.
*H04W 74/08* (2009.01)
*H04W 8/00* (2009.01)
*H04W 24/08* (2009.01)

(52) U.S. Cl.
CPC ........... *H04W 74/08* (2013.01); *H04W 24/08* (2013.01); *H04W 74/0816* (2013.01)

(58) Field of Classification Search
CPC .................... H04W 74/0816; H04W 8/005
See application file for complete search history.

(56) References Cited

U.S. PATENT DOCUMENTS

2005/0124335 A1    6/2005  Cave et al.
2007/0242621 A1*  10/2007  Nandagopalan ...... H04L 12/413
                                                              370/254

(Continued)

FOREIGN PATENT DOCUMENTS

EP            2757850 A1    7/2014
KR     10-2006-0039367 A    5/2006

(Continued)

OTHER PUBLICATIONS

LG Electronics; "Candidate Solutions for LAA Operation"; 3GPP TSG RAN WG1 Meeting #78bis; R1-144042; Ljubljana, Slovenia; Oct. 6-10, 2014; 6 pages.

(Continued)

*Primary Examiner* — Hoon J Chung (57) ABSTRACT

Method and system for managing hidden node problem in a communication network. A receiving node in the system, upon receiving a data transmission request from at least one transmitting node, dynamically checks status of the channel between the transmitting node and the receiving node. If the channel is found to be clear for transmission, then the receiving node sends a message that indicates that the channel is clear, to the transmitting node, and the transmitting node starts transmitting the data. Upon receiving a message from the receiving node that the channel is not clear for transmission, then the transmitting node waits for a particular time period and attempts the connection again.

14 Claims, 5 Drawing Sheets

(56) References Cited

U.S. PATENT DOCUMENTS

| | | |
|---|---|---|
| 2008/0112342 A1 | 5/2008 | Bennett |
| 2008/0112375 A1 | 5/2008 | Bennett |
| 2010/0091717 A1 | 4/2010 | Bonta et al. |
| 2013/0136013 A1 | 5/2013 | Kneckt et al. |
| 2013/0322279 A1 | 12/2013 | Chincholi et al. |
| 2014/0003414 A1 | 1/2014 | Choudhury et al. |
| 2015/0071211 A1* | 3/2015 | Seok .................... H04W 74/04 370/329 |
| 2015/0105067 A1* | 4/2015 | Valliappan ........ H04W 74/0808 455/424 |

FOREIGN PATENT DOCUMENTS

| | | |
|---|---|---|
| KR | 10-0676057 B1 | 1/2007 |
| WO | 2013-112983 A2 | 8/2013 |
| WO | 2013-131257 A1 | 9/2013 |

OTHER PUBLICATIONS

Foreign Communication from Related Counterpart Application; European Patent Application No. 15849642.2; Extended European Search Report and Written Opinion dated Aug. 8, 2017; 17 pages.
European Patent Office, "Communication pursuant to Article 94(3) EPC," Application No. EP15849642.2, dated May 17, 2019, 17 pages.

* cited by examiner

SYSTEM AND METHODS FOR DETECTION OF HIDDEN NODES IN CELLULAR SYSTEMS ON UNLICENSED BANDS

CROSS-REFERENCE TO RELATED APPLICATION(S)

The present application claims priority under 35 U.S.C. § 365 to International Patent Application No. PCT/KR2015/010679 filed Oct. 8, 2015, entitled "SYSTEM AND METHODS FOR DETECTION OF HIDDEN NODES IN CELLULAR SYSTEMS ON UNLICENSED BANDS", and through Indian Patent Application No. 5101/CHE/2014, which was filed on Oct. 10, 2014 and Indian Patent Application No. 5101/CHE/2014, which was filed on Oct. 7, 2015, each of which are incorporated herein by reference into the present disclosure as if fully set forth herein.

TECHNICAL FIELD

The embodiments herein relate to communication networks and, more particularly, to operation of unlicensed nodes in the communication networks.

BACKGROUND ART

In a communication network (for example in the IEEE802.11 system (Wi-Fi)), which operates in the unlicensed band, a common problem that is encountered in a dense unplanned deployment is that when the transmitter sees a clear channel, it starts transmitting data to the receiver. However, the transmitter is generally unaware of the conditions at the receiver side. Assume that the receiver is actually encountering interference from an adjacent node. In this case, the receiving node may fail to decode the data received from the transmitter, due to the interference from the adjacent node. It is to be noted that such a situation will arise when the transmitter is beyond the transmission range of the interfering node while the receiver is within the range of the interfering node.

In the existing systems, the hidden node problem is addressed by defining a set of handshake signals known as RTS (Request To Send) and CTS (Clear To Send) such that when the transmitter intends to transmit something to an intended receiver, it sends a RTS which carries the identification of the intended receiver (the address of the receiver) besides carrying the identification of the transmitter. The receiver on hearing the RTS, sends back the CTS, which also includes the identification of the transmitter and the receiver (itself). The RTS and CTS also contain the estimated duration of the intended transmission. The transmitter starts the data transfer only after receiving the CTS. If the receiver does not see the channel as free (i.e. upon detecting unmanageable interference), then it does not sends the CTS and hence the transmission is carried out. The transmitter then waits for next opportunity to send the transmission and it again carries out the RTS/CTS handshaking.

On hearing the RTS, the nodes that are within the transmission range of the transmitter assume that the transmitter intends to transmit data to the receiver as indicated in the RTS for a particular duration, which is also included in the RTS. These nodes then back off (perform back off according to the back off algorithm as defined in the standard), in order to let the transmitter perform the intended transmission. Similarly on hearing the CTS, the nodes that are within the transmission range of the receiver understand that the receiver intends to receive data from the transmitter for a particular duration, as included in the CTS. These nodes then back off (perform back off according to the back off algorithm as defined in the standard), in order to let the receiver perform the intended reception. This helps in avoiding interference from the neighboring nodes of the transmitter as well as the receiver, thereby ensuring smooth communication.

The unlicensed band can support operation of cellular systems as well. However, presence of the hidden node problem can cause signal interference and in turn can result in bad user experience.

DISCLOSURE OF INVENTION

Solution to Problem

An object of the embodiments herein is to provide a mechanism for overcoming a hidden node issue, which is prevalent in the operation over unlicensed bands, hereby enabling an interference free operation of a cellular communication network on unlicensed bands.

In view of the foregoing, an embodiment herein provides a system for dynamically managing a hidden node problem in an unlicensed communication network. The system comprises of a hardware processor; and a non-volatile memory comprising instructions. The instructions are configured to cause the hardware processor to receive a data transmission request from at least one transmitting node in the unlicensed communication network, by a receiving node in the unlicensed communication network. The receiving node further determines dynamically, status of a channel between the transmitting node and the receiving node as one of a clear for transmission and not clear for transmission, wherein the status of the channel is determined based on interference caused by at least one neighboring node. The receiving node further communicates the determined status of the channel to the transmitting node. If the status of the channel is clear for transmission, then the transmitting node transmits data to the receiving node, through the channel. The transmitting node attempts to establish communication with the receiving node, after a specified time period, if the status of the channel is not clear for transmission.

Embodiments further disclose a method for dynamically managing a hidden node problem in an unlicensed communication network. In this method, a receiving node in the unlicensed communication network receives a data transmission request from at least one transmitting node in the unlicensed communication network. Further, the receiving node determines dynamically, status of a channel between the transmitting node and the receiving node as one of a clear for transmission and not clear for transmission, wherein the status of the channel is determined based on interference caused by at least one neighboring node. The receiving node then communicates the determined status of the channel to the transmitting node. The transmitting node starts data transmission through the channel, to the receiving node, if the status of the channel is clear for transmission. The transmitting node attempts to establish communication with the receiving node, after a specified time period, if the status of the channel is not clear for transmission.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following detailed description with reference to the drawings, in which.

BEST MODE FOR CARRYING OUT THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a mechanism for managing hidden nodes in a communication network. Referring now to the drawings, and more particularly to FIGS. 1 through 6, where similar reference characters denote corresponding features consistently throughout the figures, there are shown embodiments.

Figure 1:
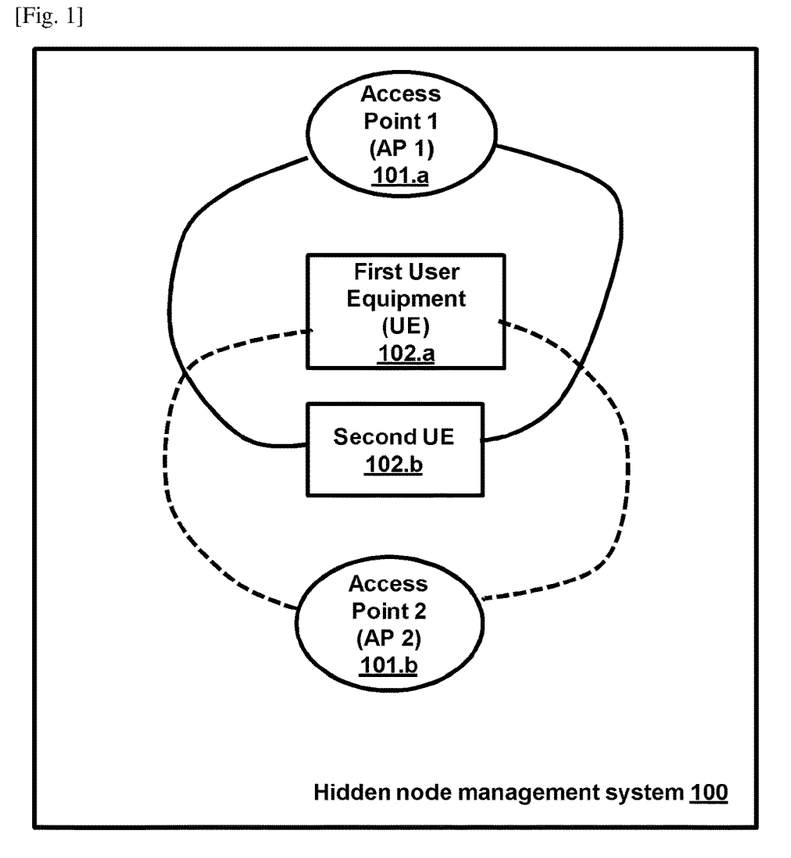
FIG. 1 illustrates a block diagram of the Hidden node management system, as disclosed in the embodiments herein.

FIG. 1 illustrates a block diagram of the Hidden node management system, as disclosed in the embodiments herein. The network as in the FIG. 1 depicts an Access Point 1 (AP 1) 101.*a* trying to communicate with a first User Equipment 102.*a* and an Access Point 2 (AP 2) 101.*b* communicating with a second User Equipment 102.*b*. In a different implementation, at least one of the Access points 101 can be replaced with an LTE LAA eNB. It is to be noted that in actual implementation, the number of APs and number of UEs being served by each AP can vary, according to the requirements, and any other parameters. Further, the UE 102 that is initiating communication with another UE 102 is termed as transmitting node, and the UE 102 that responds to a communication request received from at least one other UE 102 is termed as a receiving node. The terms are used interchangeably, throughout.

In this network architecture, the communication between AP2 and UE 2 can cause interference to a communication involving the first UE 102.*a*, as the first UE 102.*a* is in the transmission range of the AP2. In this case, the AP2 does not realize that the communication involving the first UE 102.*a* is affected, as the AP1 is outside the transmission range of the AP2. Similarly, the communication involving the second UE 102.*b* can be affected by the communication between the first UE 102.*a* and the AP1.

In the hidden node management system 100, upon receiving a transmission request from the AP1, the first UE 102.*a* checks if the channel between the first UE 102.*a* and the AP1 is clear for transmission or not. In an embodiment, the channel is considered to be clear for transmission or not clear for transmission, based on the current/predicted interference level in the channel. If the channel is found to be clear for transmission, a message indicating that the channel is clear for transmission is sent to the AP1 by the first UE 102.*a*, and the AP1 initiates communication upon receiving the clear for transmission message. If the channel is found to be not clear for transmission, then the first UE 102.*a* communicates, using a suitable message of pre-defined type, to the AP1 that the channel is not clear for transmission. The first UE 102.*a* may also indicate for how long the channel is not expected to be clear for transmission. The AP1, upon receiving this message from the first UE 102.*a*, waits for the specified time period, and then re-attempts transmission. The same procedure can be repeated by other UEs 102 and APs 101 in the communication networks the hidden node management system has been associated with.

In another embodiment, the hidden node management system 100 can be configured to manage the hidden node problem when the communication between the transmitting node and the receiving node is active. In this scenario, the receiving node may detect, while the communication is active, presence of a hidden node that is causing interference. In this scenario, the receiving node can notify the transmitting node that a hidden node is causing interference. Upon receiving the notification, the transmitting node can stop data transmission to prevent data loss. In this scenario, the receiving node can secure the channel for communication with the transmitting node, by broadcasting a message (such as RTS), which makes the neighboring node think that the receiving node is about to initiate data transmission with at least one other node in the network; hence retreats from any communication for a period of time.

Figure 2:
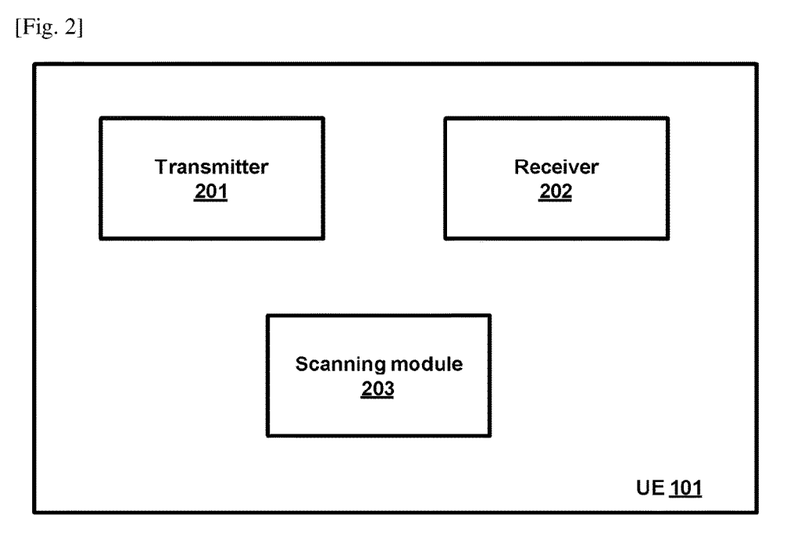
FIG. 2 is a block diagram that depicts components of a User Equipment (UE) in the Hidden node management system, as disclosed in the embodiments herein.

FIG. 2 is a block diagram that depicts components of a User Equipment (UE) in the Hidden node management system, as disclosed in the embodiments herein. The UE 102 comprises of a transmitter 201, a receiver 202, and a scanning module 203.

The transmitter can 201 be configured to transmit any control as well as data signals to other nodes in the communication network, while and after establishing a communication with the node. The transmitter 201 can be configured to process the data being transmitted, as intended, for the purpose of transmitting through at least one suitable channel.

The receiver can be configured to receive any control as well as data signals from other nodes in the communication network, while and after establishing a communication with the node.

The scanning module 203 can be configured to perform different actions based on the role of the UE 102; the scanning module is a part of.

1) In the Transmitting Node (i.e. the UE that Initiates Communication):

The scanning module 203 in the transmitting node can be configured to initiate with the intended receiving node, by sending necessary signals that are part of the standard handshake procedure. The scanning module 203 can be further configured to collect, using the receiver 202, information pertaining to the status of the channel, from the receiving node. The scanning module 203 can be further configured to perform at least one action corresponding to the status of the channel, as communicated by the receiving node. For example, if the status indicates that the channel is clear for transmission, then the scanning module 203 can initiate data transmission from the transmitting node. If the status indicates that the channel is not clear for transmission, then the scanning module 203 can wait for a particular time period, before re-attempting data transmission with the receiving node.

2) In the Receiving Node (i.e. the UE that Receives Communication Request from Another UE):

In the receiving node, the scanning module 203 can be configured to receive a communication request from at least one transmitting node. The scanning module 203 can be further configured to determine, dynamically, status of a channel that needs to be used to communicate with the transmitting node from which the communication request has been received. The scanning module 203 can be further configured to communicate, using the transmitter 201, the determined status of the channel to the transmitting node.

Figure 3:
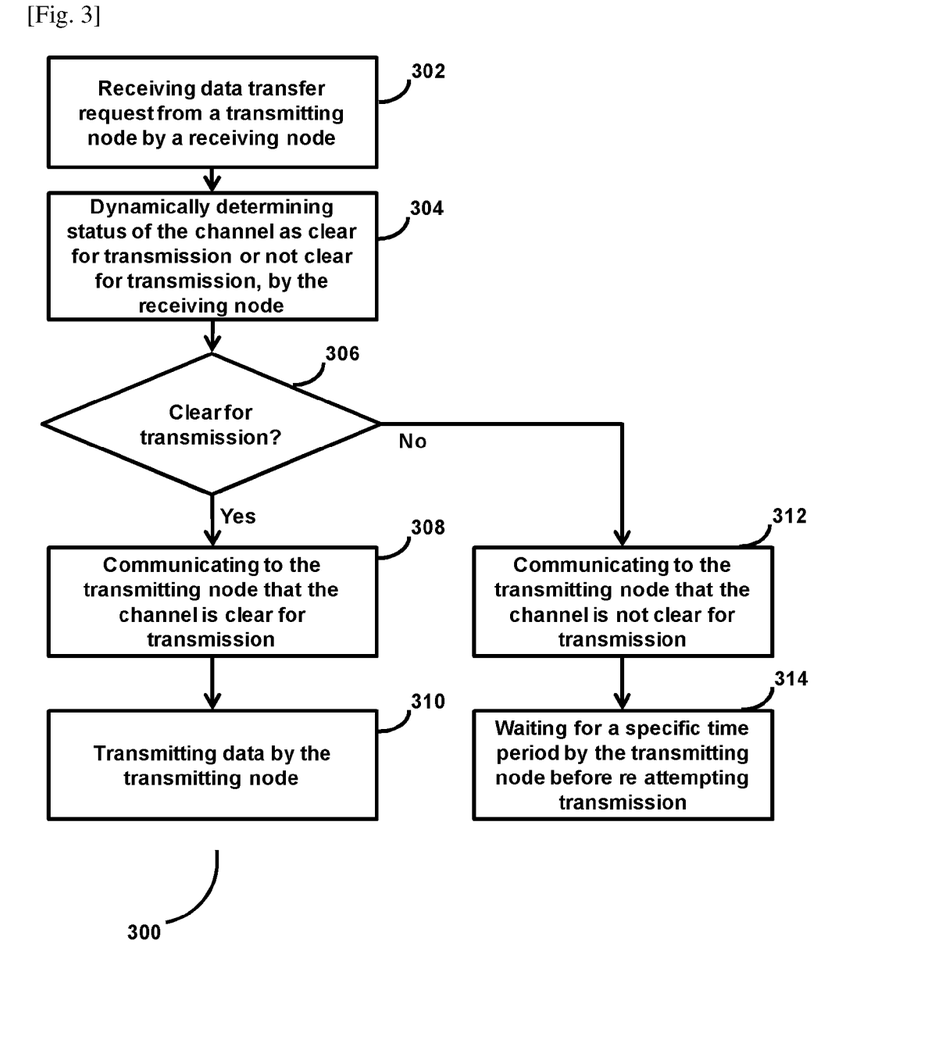
FIG. 3 is a flow diagram that depicts steps involved in the process of managing hidden nodes in the communication network, using the Hidden node management system, as disclosed in the embodiments herein.

FIG. 3 is a flow diagram that depicts steps involved in the process of managing hidden nodes in the communication network, using the Hidden node management system, as disclosed in the embodiments herein. A receiving node 102.*b* initially receives (302) a data transfer request from at least one transmitting node 102.*a*. The transmitting node 102.*a* can be configured to send the data transfer request, using at least one suitable message type. For example, the message type is an Indication for Transmission (IFT). The IFT message can comprise of an identity of the receiving node 102.*b*. Adding the identity of the receiving node 102.*b* can help to differentiate between messages that are sent to different receiving nodes at once, and accordingly route the messages to corresponding receiving nodes 102. This mechanism helps transmission of data to multiple receiving nodes simultaneously. In various other embodiments, the IFT may or may not contain address of the transmitting node 102.*a*. The transmitting node 102.*a* can specify, in the IFT message, duration for which the communication between the transmitting and receiving nodes may take place, to have the intended data sent to the receiving node 102.*b*. In another embodiment, the list of intended receiving nodes can be broadcasted before sending the IFT message. In another embodiment, if same message is to be sent to multiple receiving nodes, the receiving nodes can be grouped together, and a common ID assigned at the group level can be used by the transmitting node, while transmitting the IFT message. In another embodiment, an indication to monitor the unlicensed channel can be sent on a licensed channel. In case of multi carrier unlicensed carriers being used, a carrier specific ID may also be given along with the group ID so as to differentiate between different carriers. The transmitting node 102.*a* can also be configured to apply suitable encoding scheme while transmitting the data transmission request to the receiving node 102.*b*. In various embodiments, the IFT is sent on licensed or unlicensed channels.

Upon receiving the request, the receiving node 102.*b* determines dynamically (304), status of the channel that connects the receiving node 102.*b* to the transmitting node 102.*a* that sent the data transfer request. In an embodiment, the status of the channel is identified in terms of the interference experienced/predicted in that channel, because of the signals from at least one of the neighboring nodes that is currently being communicating with at least one other node in the communication network. If the neighboring UE is found to be causing interference in the channel, then the status of the channel is identified as not clear for transmission. If the interference level is found to be Nil, or well within a permitted limit i.e. a threshold value, then the channel is identified as clear for transmission.

The dynamically determined status of the channel is further communicated to the transmitting node 102.*a*, by the receiving node 102.*b*. The receiving node 102.*b* can communicate the status of the channel to the transmitting node 102.*a* as Clear for Transmission (CFT) or Not Clear for Transmission (NCFT) messages. In another embodiment, the receiving node 102.*b* can use Hidden Node Free (HNF) message to communicate to the transmitting node 102.*a* that the channel is clear for transmission. In this scenario, if the channel is not clear for transmission, the receiving UE 102.*b* may not respond to the request received from the transmitting UE 102.*a*, and the receiving node 102.*b* can be configured to presume that the channel is not free for transmission. In various embodiments, the data transfer request as well as the response (i.e. the channel status) can be sent on licensed as well as unlicensed channels.

In an embodiment, the messages (such as CFT, NCFT, HNF) that are used to convey the status of the channel to the receiving node 102.*b* contain address/identity of only the receiving nodes 102.*b*. In an alternate embodiment, these messages can contain identity of the transmitting node as well, along with that of the receiving node. In an embodiment, the determined status of the channel is communicated to the transmitting node such that all the neighboring nodes of the receiving node 102.*b* can hear the message, so that they can retreat from transmitting any data for which the receiving node 102.*b* is communicating; thereby avoiding chance of interference. The receiving node 102.*b* can be further configured to apply suitable decoding scheme to decode the data received from the transmitting node 102.*a*. In various embodiments, the messages CFT/NCFT/HNF is sent through licensed or unlicensed channel.

Upon receiving the status of the channel as clear for transmission, the transmitting node 102.*a* starts transmitting (310) the data to the receiving node 102.*b*, over the channel. If the status of the channel is communicated as not clear for transmission, then the transmitting node 102.*a* waits for a particular time period, as indicated in the message received, and can re-attempt connection and transmission to the receiving node 102.*b* after waiting for the specified time period. The various actions in method 300 may be performed in the order presented, in a different order or simultaneously. Further, in some embodiments, some actions listed in FIG. 3 may be omitted.

Figure 4:
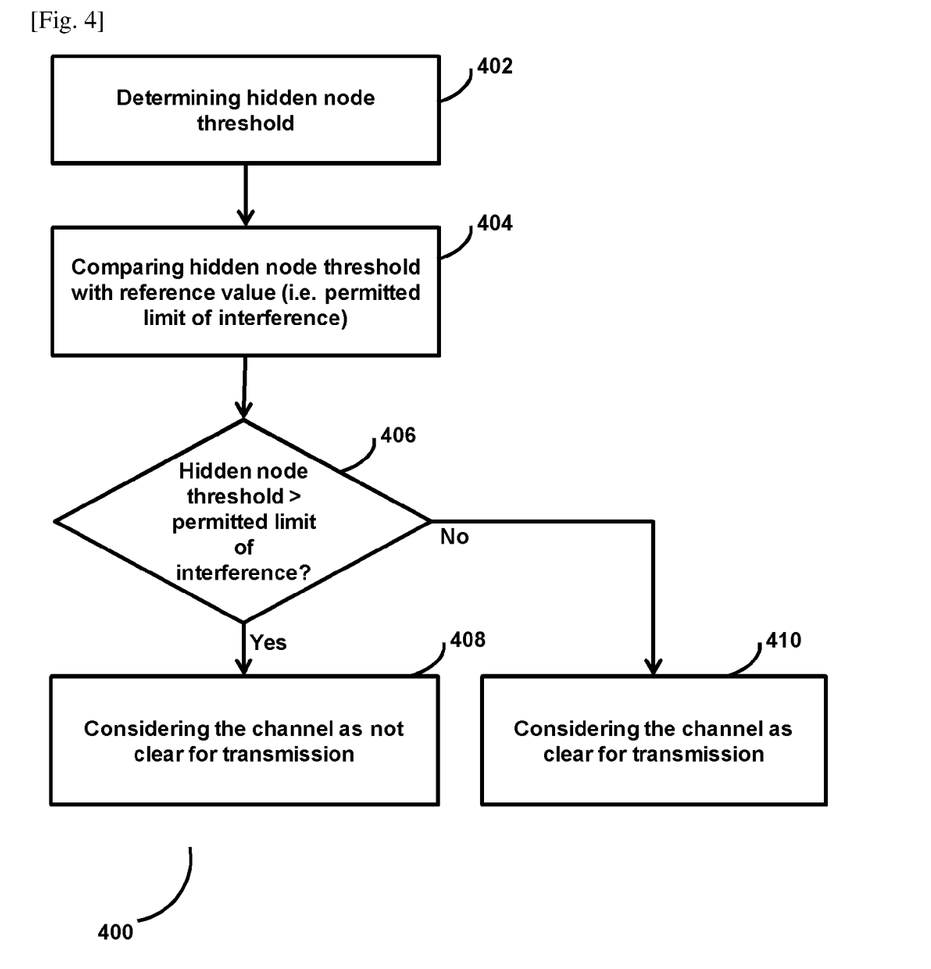
FIG. 4 is a flow diagram that depicts steps involved in the process of determining status of the channel based on hidden node threshold, using the Hidden node management system, as disclosed in the embodiments herein.

FIG. 4 is a flow diagram that depicts steps involved in the process of determining status of the channel based on hidden node threshold, using the Hidden node management system, as disclosed in the embodiments herein. The receiving node 102.b can be configured to determine the status of the channel that needs to be used for communicating with the transmitting node that sent the data transmission request, based on the hidden node threshold value.

In an embodiment, the receiving node 102.b determines (402) value of the hidden node threshold, in terms of the amount of interference detected in the channel. In another embodiment, the value of hidden node threshold is determined based on the number of instances at least one hidden node has been visible for the receiving node 102.b, in a certain time limit. Further, the determined hidden node threshold value is compared (404) with a reference value pertaining to a permitted limit of interference. In an embodiment, the reference value i.e. the permitted limit of interference refers to a value of the interference level in the channel that does not affect communication in the channel, wherein the permitted limit of interference is pre-configured. The value of the permitted level of interference can be measured based on experimental values, and can be pre-configured in any memory module associated with the receiving node 102.b.

The receiving node 102.b considers (408) the channel as occupied and not clear for transmission, if the determined hidden node threshold is found to match or exceed the reference value. If the value of determined hidden node threshold is less than the reference value, then the receiving node 102.b considers (410) the channel as clear for transmission. The corresponding status message is then transmitted to the transmitting node 102.a. The various actions in method 400 may be performed in the order presented, in a different order or simultaneously. Further, in some embodiments, some actions listed in FIG. 4 may be omitted.

Figure 5:
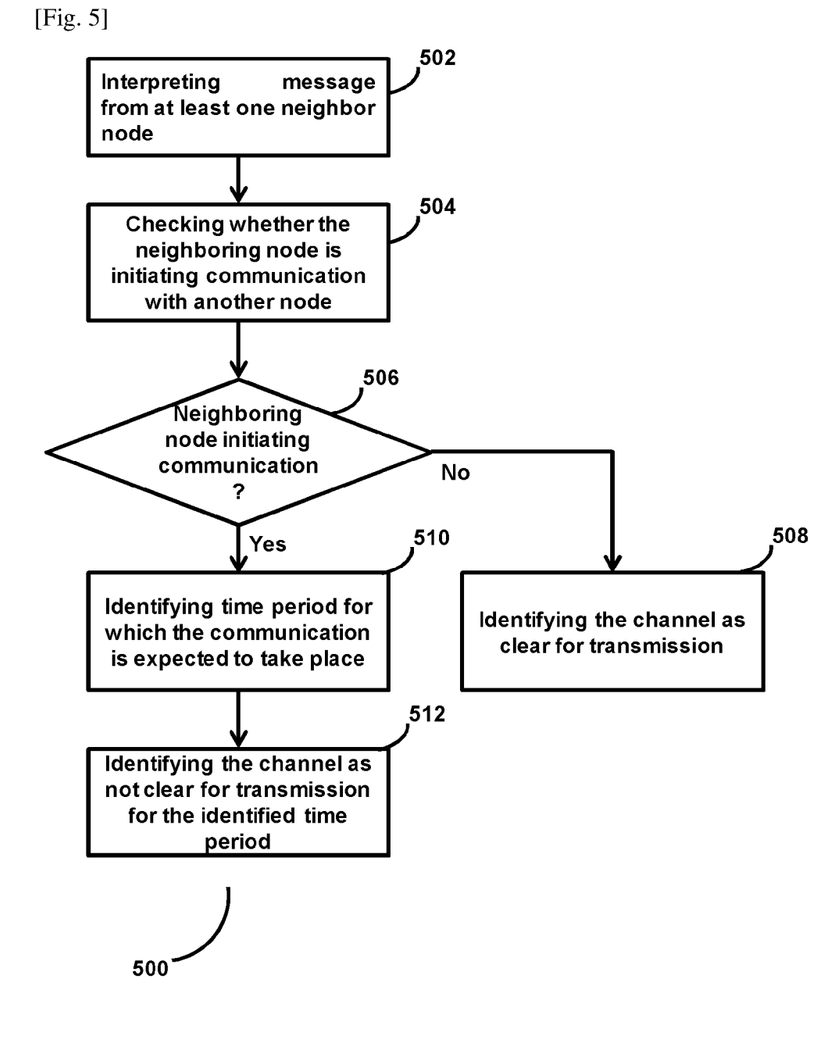
FIG. 5 is a flow diagram that depicts steps involved in the process of determining status of the channel by interpreting at least one message received from a neighboring node, using the Hidden node management system, as disclosed in the embodiments herein.

FIG. 5 is a flow diagram that depicts steps involved in the process of determining status of the channel by interpreting at least one message received from a neighboring node, using the Hidden node management system, as disclosed in the embodiments herein. Any receiving node in the communication request responds to a data transfer request received from another node, by determining and sending status of the channel existing between them. Further, if the channel is clear for transmission, then the data transfer happens between the nodes.

When a receiving node 102.b is trying to determine status of the channel, it may interpret (502) messages (status message or actual communication) from the neighboring nodes. By interpreting the message collected, the receiving node 102.b checks (504) if the neighboring node is initiating a communication with at least one other node in the network.

If the message indicates that the neighboring channel is getting involved in a communication with another node, then the receiving node 102.b, by processing the interpreted message, identifies (510) the time period for which the data transfer/communication is expected to take place. In an embodiment, the time duration of communication is specified in the interpreted message. The receiving node 102.b thus identifies (512) the channel as not clear for transmission, for the specified time period. If the neighboring node is found to be not getting involved in any communication, then the receiving node 102.b considers (508) the channel as clear for transmission.

The corresponding status message is then transmitted to the transmitting node 102.a. The various actions in method 500 may be performed in the order presented, in a different order or simultaneously. Further, in some embodiments, some actions listed in FIG. 5 may be omitted.

Figure 6:
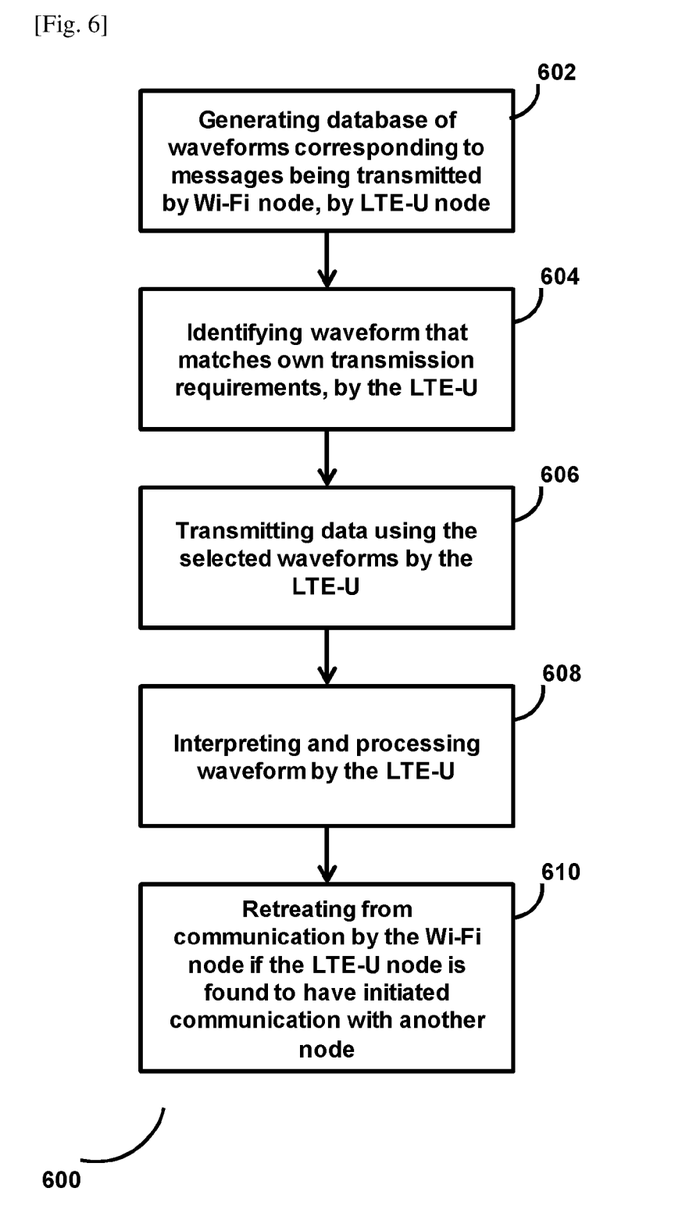
FIG. 6 is an example flow diagram that depicts steps involved in the process of managing hidden node problem in a network comprising Long Term Evolution-Unlicensed bands (LTE-U) and Wi-Fi nodes, using the hidden node management system, as disclosed in the embodiments herein.

FIG. 6 is an example flow diagram that depicts steps involved in the process of managing hidden node problem in a network comprising LTE-U and Wi-Fi nodes, using the Hidden node management system, as disclosed in the embodiments herein. The hidden node management system 100 can be configured to manage the hidden node problem in which licensed as well as unlicensed carriers are involved. In a scenario in which nodes operating in the licensed as well as unlicensed bands are involved, the nodes that are operating on the unlicensed bands can act as the hidden nodes for the nodes that are operating on the licensed bands. The reason is that the nodes in the licensed and unlicensed bands may not be able to understand each other's communication, as they are at different frequencies and the nodes may not be capable of receiving the said different frequencies. However, the hidden node management system 100 can be configured to streamline the hidden node management in a network that comprises nodes that operate on licensed bands and those which work on unlicensed bands.

In this example scenario discussed using the FIG. 6 consider that a Wi-Fi nodes is the neighboring node of an LTE-U node. In order to ensure that the Wi-Fi node understands messages originated from the LTE-U/LTE-LAA (License Assisted Access) node, a database of waveforms corresponding to messages (preferably the messages being used by the Wi-Fi nodes to indicate status of the channel, while establishing communication with at least one other node) being generated by the Wi-Fi node is generated (602) and stored in a suitable location such that the LTE-U node can access it when required.

When the LTE-U node wants to transmit any message to another node for establishing a communication, it identifies (604) waveforms that match own transmission requirements, from the database. For example, the data transmission requirements can be defined in terms of transmission time value of the waveform such that the waveform that has a transmission time value closest to that of an intended transmission is selected for communication. Further, the LTE-U nodes communicates (606) with the other node, using the selected waveforms.

When the LTE-U node starts data transmission, the neighboring node i.e. the Wi-Fi node in this example, interprets and processes (608) the waveforms transmitted from the LTE-U node. As the message is in a form that matches the messages being originated from the Wi-Fi node, the Wi-Fi node can understand the contents of the message. If the message indicates that the LTE-U node is initiating communication with another node in the network, then the Wi-Fi node retreats (610) from initiating/getting involved in any communication, for the time period the LTE-U node is communicating; thereby avoiding interference. The various actions in method 600 may be performed in the order presented, in a different order or simultaneously. Further, in some embodiments, some actions listed in FIG. 6 may be omitted.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein specify a mechanism for handling hidden node problem in a communication network. The mechanism allows management of hidden node problem, providing a system thereof. Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for ex. Very high speed integrated circuit Hardware Description Language (VHDL), another programming language, or implemented by one or more VHDL or several software modules being executed on at least one hardware device. The hardware device can be any kind of device which can be programmed including, for ex. any kind of a computer like a server or a personal computer, or the like, or any combination thereof, for ex. one processor and two FPGAs. The device may also include means which could be for ex. hardware means like an ASIC or a combination of hardware and software means, an ASIC and an FPGA, or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for ex. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. An apparatus of a first user equipment (UE) in a communication network, the apparatus comprising:
   a transceiver; and
   a processor configured to:
      control the transceiver to receive a data transmission request from a second UE, dynamically determine whether a status of a channel between the first UE and the second UE is clear for transmission, based on signals from at least one neighboring UE communicating with at least one other UE and a permitted limit of interference, and
      control the transceiver to transmit the determined status of the channel to the second UE,
   wherein the first UE and the second UE are a long term evolution-unlicensed (LTE-U) node and the neighboring UE is a Wi-Fi node,
   wherein a plurality of waveforms that represent at least one of signal transmission being handled by the Wi-Fi node are stored in a reference database,
   wherein at least one of the waveform that matches a transmission requirement of the LTE-U node is selected from the reference database, and
   wherein the at least one of the waveform is used by the LTE-U node for communication with at least one other LTE-U node.

2. The apparatus as claimed in claim 1, wherein the processor determines a status of the channel by interpreting message from the at least one neighboring UE, and
   wherein the processor is further configured to:
      check whether the at least one neighboring UE is communicating with at least one other UE, by analyzing the message,
      identify the status of the channel as clear for the transmission, if the at least one neighboring UE is not communicating with the at least one other UE, and
      identify the status of the channel as not clear for the transmission, if the at least one neighboring UE is communicating with the at least one other UE.

3. The apparatus as claimed in claim 1, wherein if a communication with the at least one other LTE-U node is initiated, Wi-Fi node is configured to retreat from any communication with any other node in the communication network, for a period during which the LTE-U node is communicating with the at least one other LTE-U node.

4. The apparatus as claimed in claim 1, wherein the plurality of waveforms correspond to messages being used by Wi-Fi nodes to indicate status of the channel.

5. The apparatus as claimed in claim 1, wherein the processor is further configured to secure the channel for a communication with the second UE, upon detecting from the at least one neighboring UE, by broadcasting at least one message of a pre-determined type,
   wherein the message indicates to the at least one neighboring UE that the first UE is initiating data transfer with at least one other UE, and
   wherein the message makes the neighboring UE retreat from initiating communication for a period of time.

6. The apparatus as claimed in claim 1, wherein the processor is further configured to control the transceiver to transmit a status of the channel by transmitting at least one of message which indicates that the channel is clear, or a message which indicates that the channel is not clear.

7. A method for communicating by a first user equipment (UE) in a communication network, the method comprising:
   receiving a data transmission request from a second UE;
   dynamically determining whether a status of a channel between the first UE and the second UE is clear for transmission, based on signals from at least one neighboring UE communicating with at least one other UE and a permitted limit of interference; and
   transmitting the determined status of the channel to the second UE,
   wherein the first UE and the second UE are a long term evolution-unlicensed (LTE-U) node and the neighboring UE is a Wi-Fi node,
   wherein a plurality of waveforms that represent at least one signal transmission being handled by the Wi-Fi node are stored in a reference database,
   wherein at least one of the waveform that matches a transmission requirement of the LTE-U node is selected from the reference database, and
   wherein the at least one of the waveform is used by the LTE-U node for communication with at least one of other LTE-U node.

8. The method as claimed in claim 7, wherein the status of the channel is determined by interpreting message from the at least one neighboring UE, and
   wherein the determining the status of the channel comprises:

checking whether the at least one neighboring UE is communicating with at least one other UE, by analyzing the message;

identifying the status of the channel as clear for transmission, if the at least one neighboring UE is not communicating with the at least one other UE; and identifying the status of the channel as not clear for transmission, if the at least one neighboring UE is communicating with the at least one other UE.

9. The method as claimed in claim 7, wherein if a communication with the at least one other LTE-U node is initiated, the Wi-Fi node is configured to retreat from any communication with any other node in the communication network, for a period during which the LTE-U node is communicating with the at least one other LTE-U node.

10. The method as claimed in claim 7, wherein the plurality of waveforms correspond to messages being used by Wi-Fi nodes to indicate status of the channel.

11. The method as claimed in claim 7, wherein the channel for a communication between the first UE and the second UE is secured upon detecting the signals from the at least one neighboring UE, wherein securing the channel comprises broadcasting at least one message of a pre-determined type, which indicates to the at least one neighboring UE that the first UE is initiating data transfer with at least one other UE in the communication network, and wherein the message makes the neighboring UE retreat from initiating communication for a period of time.

12. The method as claimed in claim 7, wherein the transmitting the status of the channel comprises, transmitting at least one of message which indicates that the channel is clear, or a message which indicates that the channel is not clear.

13. An apparatus of a second user equipment (UE) in a communication network, the apparatus comprising:

a transceiver; and a processor configured to:
control the transceiver to transmit a data transmission request to a first UE,
control the transceiver to receive a status of a channel between the first UE and the second UE, from the first UE,
initiate a data transmission to the first UE, through the channel, if the status of the channel is clear for the data transmission, and
attempt to establish communication with the first UE, after a specified time period, if the status of the channel is not clear for the data transmission,
wherein the status of the channel is determined based on a permitted limit of an interference, wherein the first UE and the second UE are a long term evolution-unlicensed (LTE-U) node and a neighboring UE is a Wi-Fi node, wherein a plurality of waveforms that represent at least one of signal transmission being handled by the Wi-Fi node are stored in a reference database, wherein at least one of the waveform that matches a transmission requirement of the LTE-U node is selected from the reference database, and wherein the at least one of the waveform is used by the LTE-U node for communication with at least one of other LTE-U node.

14. A method for communicating by a second user equipment (UE) a communication network, the method comprising:

transmitting a data transmission request to a first UE in the communication network, receiving a status of a channel between the second UE and the first UE, from the first UE;

initiating a data transmission to the first UE, through the channel, if the status of the channel is clear for the data transmission; and attempting to establish communication with the first UE, after a specified time period, if the status of the channel is not clear for the data transmission, wherein the status of the channel is determined based on a permitted limit of an interference, wherein the first UE and the second UE are a long term evolution-unlicensed (LTE-U) node and a neighboring UE is a Wi-Fi node, wherein a plurality of waveforms that represent at least one of signal transmission being handled by the Wi-Fi node are stored in a reference database, wherein at least one of the waveform that matches transmission requirement of the LTE-U node is selected from the reference database, and wherein the at least one of the waveform is used by the LTE-U node for communication with at least one of other LTE-U node.

* * * * *